United States Patent Office 3,479,751
Patented Nov. 25, 1969

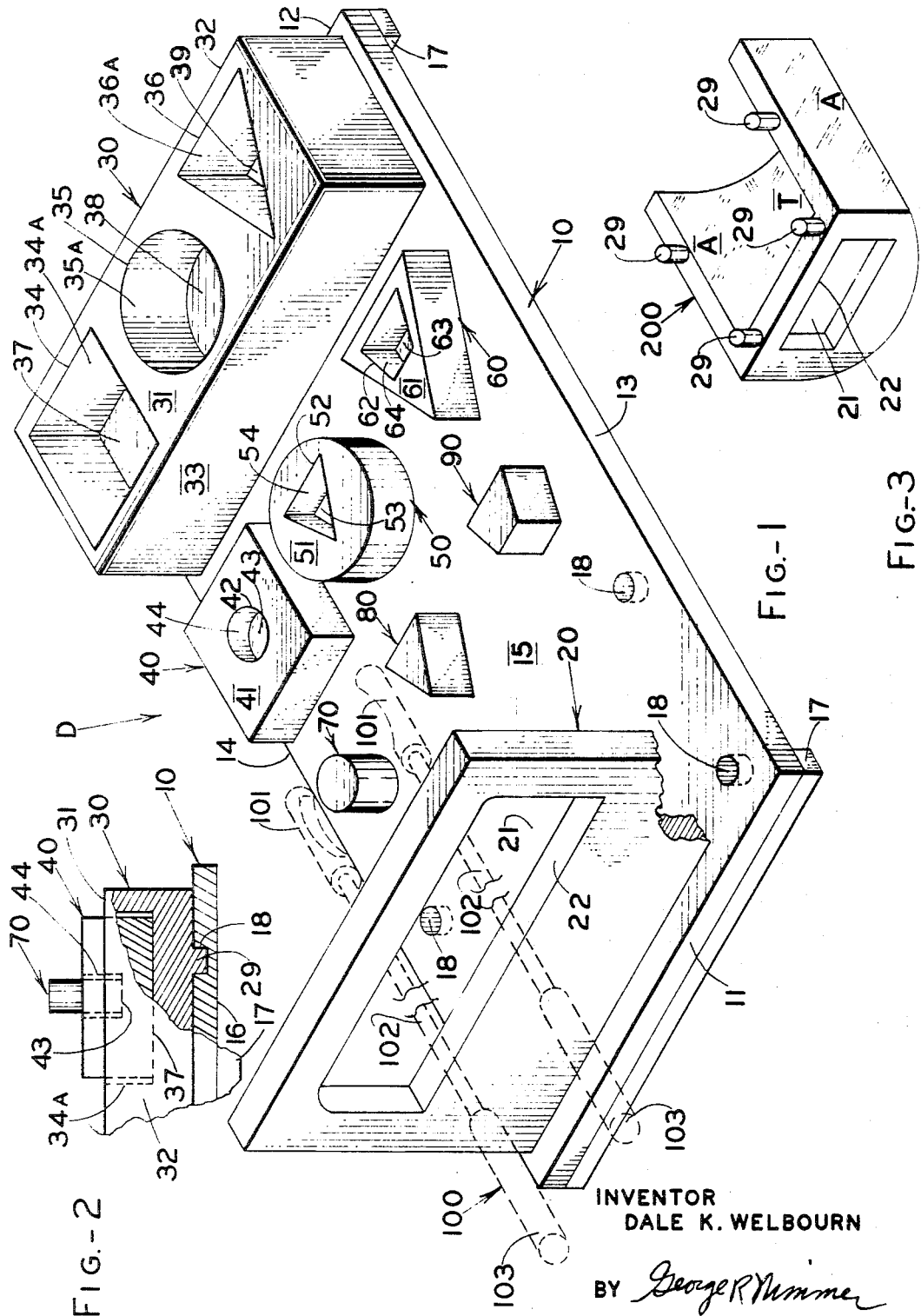

3,479,751
MANUAL DEXTERITY TRAINING DEVICE
Dale K. Welbourn, Neola, Iowa 51559
Filed Apr. 10, 1967, Ser. No. 629,691
Int. Cl. G09b *15/06;* A63b *21/00, 23/00*
U.S. Cl. 35—29  10 Claims

ABSTRACT OF THE DISCLOSURE

This invention relates to a device for training and developing the manual dexterity of human subjects, and in particular, this invention provides a novel combination, positions, and relationships of movable blocks and recesses therefor, together with a forwardly positioned recessed pedestal and a rearwardly positioned slotted shield, the utilization of said device resulting in steady development of manual dexterity in a challenging and pleasant manner.

---

It is the general object of the present invention to provide a game-like training device that is amusing and challenging to human subjects of whatever degree of mental sophistication and physical dexterity.

It is a specific object of the present invention to provide a manual dexterity training device that provides amusement, challenge, and dexterity improvement for a wide range of human subjects ranging from mentally retarded persons and immature children to sophisticated intelligent adults.

It is another object of the present invention to provide a readily modifiable amusement and training device, that is suitable for use by a wide range of human subjects.

It is another object to provide an economic structure that is adapted for manufacture in separable parts for ease in shipment, storage, and commercial display.

With the above and other objects and advantages in view which will become more apparent as the description proceeds, this invention comprises the novel configuration, combination, and arrangement of parts, as hereinafter more fully described and as especially pointed out in the appended claims, reference being had to the accompanying drawing wherein like numbers refer to like parts in the several views and in which:

FIGURE 1 is a perspective view of the manual-dexterity training device of the present invention, six movable blocks being shown in a typical "start" position for a manual-dexterity exercise which involves inserting certain of the movable blocks into recessed portions of the training device transverse pedestal member.

FIGURE 2 is a forward elevational view, partially in section, of a representative portion of the recessed pedestal member, at a typical "finish" position for a manual-dexterity exercise involving said movable blocks.

FIGURE 3 is a perspective view of an alternate type removably attachable shield member component for the manual-dexterity training device.

The dexterity training device D of the present invention comprises a generally horizontal elongate base member 10 having a transverse rearward end 11 and a transverse forward end 12; an upright transverse shield 20 attached nearer to the base rearward end 11 than to base forward end 12, said upright shield 20 being provided with a transverse slot 21 to permit manually-manipulatable grasping tools to be inserted in the forward direction e.g. toward base forward end 12, through the shield slot 21, as indicated in phantom line in FIGURE 1; a transverse pedestal member 30 attached adjacent to the base member forward end 12 remote of rearward end 11, said pedestal having an upper surface 31, said pedestal member upper surface 31 having a plurality of pedestal recesses e.g. 34–36; and a plurality of primary-blocks (e.g. 40, 50, and 60), at least one of said primary-blocks being of similar cross-sectional shape to that of at least one of said pedestal recesses whereby a primary block may be removably disposed within said pedestal-recess e.g. rectangular block 40 in rectangular recess 34, circular block 50 in circular recess 35, and triangular block 60 in triangular recess 36.

Elongate base member 10 may be of the rectangular configuration shown in FIGURE 1 including a forward transverse end 12, a rearward transverse end 11, a first elongate side 13, a second elongate side 14 parallel to first side 13, and a substantially horizontal planar rectangular upper surface 15 defined by extremities 11–14. A pair of opposed elevator bars 17 attached to the lower surface 16 of base member 10 adjacent to base transverse ends 11 and 12 may be employed to maintain base member upper surface 15 in parallelism above a suitable supporting substrate e.g. a table top (not shown). Base member upper surface 15 may also include a plurality of downwardly-extending cavities or mortises 18, which may be employed to removably engage integral pins 29 of the upright shield member e.g. 20, 200. Transverse slot 21 of upright transverse shield 20 has a substantially horizontal planar lower side 22, said lower side 22 being substantially parallel to base member upper surface 15.

Transverse pedestal member 30 may take the rectangular bar form as shown in FIGURE 1. Pedestal member 30 preferably has a transverse planar rearward surface 33 that is desirably perpendicular with respect to base member upper planar surface 15. Transverse pedestal 30 may be removably attached to base member 10 as by the combination of integral dowel pins 29 of pedestal 30 and cavities 18 in base member 10. Upper surface 31 of pedestal member is preferably of substantially planar horizontal configuration, and pedestal member upper surface 31 and transverse slot lower side 22 are preferably substantially co-planar and of equal elevation above base member upper surface 15 so as to facilitate operation of training device D.

Pedestal member upper surface 31 has a plurality of downwardly-extending pedestal-recesses therein, each of the pedestal-recesses being of a distinct geometrical cross-sectional shape, and preferably, at least two different geometrical cross-sectional shapes should be represented among the array or collection of pedestal-recesses. The general requirements for the pedestal-recesses are illustrated by, but not limited to, the collection of three pedestal-recesses 34–36 shown in FIGURE 1, pedestal-recess being of rectangular cross-sectional shape, pedestal-recess 35 being of circular cross-sectional shape, and pedestal-recess 36 being of equilateral triangular cross-sectional shape. As further indicated in FIGURE 1 the lower extremities or floors 37–39 of pedestal-recesses 34–36, respectively, are preferably substantially planar and horizontal, said lower extremities being elevated above and in substantial parallelism with base upper surface 15. The respective upright sidewalls 34A–36A of pedestal-recessed 34–36, respectively, are preferably vertical with respect to floors 37–39, and the height of sidewalls 34A–36A are shorter than the sidewalls of the mateable primary-blocks 40, 50, and 60, as illustrated in FIGURE 2 with reference to primary-block 40.

The respective movable primary-blocks e.g. 40, 50, and 60, necessarily include planar lower bases so that each of said primary-blocks will stably uprightly rest upon base member upper surface 15 between shield 20 and pedestal 30. Preferably, the cross-sectional shape of each primary-block is regular along its vertical central axis, and accordingly, all horizontal sections of a primary-block taken parallel to its planar lower base are substantially identical. At least one of the primary-blocks is of similar cross-sectional shape to that of at least one of the pedestal-recesses whereby said at least one primary block may be removably inserted within said at least one pedestal-recess, as exemplified in FIGURE 2. Moreover, as indicated in the FIGURE 1 perspective view, there is desirably a mateable primary-block for each pedestal-recess. Thus, the cross sectional shapes for the illustrative primary-blocks 40, 50, and 60, are appropriately rectangular, circular, and triangular, respectively. As illustrated in the FIGURE 2 elevational view, each primary-block is of slightly smaller cross-sectional size than is its mating pedestal recess, so as to facilitate the insertion of said primary-block into the pedestal-recess with a pair of manually-operated tongs or similar grasping tool. In this same vane, the height of each primary-block e.g. 40, should exceed the sidewall height e.g. 34A, of each mateable pedestal-recess so that the upper end of each primary-block may be conveniently grasped with a pair of manually-operated tongs or similar hand tool during the insertion of the primary-block into the appropriate pedestal-recess.

The combination of the pedestal-recesses and the mating movable primary-blocks heretofore described are sufficient to provide a dexterity training device for the early stages of manual dexterity development; however, the inclusion of one or more block-recesses e.g. 42, 52, and 62, together with one or more mating movable secondary-blocks, for said blocks recesses, is necessary for developing higher stages of manual dexterity. For example, the representative primary-blocks 40, 50, and 60, may each have a planar horizontal upper surface 41, 51, and 61, respectively. The planar upper surface 41 of rectangular primary-block 40 has a downwardly-extending axial block-recess 42 of circular cross-sectional shape, planar upper surface 51 of circular primary-block 50 has a block-recess 52 of triangular cross-sectional shape, and planar upper surface 61 of triangular primary-block 60 has a block-recess 62 of trapezoidal cross-sectional shape. As further indicated in FIGURE 1, the lower extremities or floors 43, 53, and 63, of block-recesses 42, 52, and 62, respectively, are preferably substantially planar and horizontal, said block-recess lower-extremities being located a finite distance above the planar lower surface of said respective primary-blocks. The respective upright sidewalls 44, 54, and 64, of block-recesses 42, 52, and 62, respectively, are preferably vertical with respect to floors 43, 53, and 63, respectively. Moreover, as indicated in FIGURE 2, the height of block-recess sidewalls 44, 54, and 64, are shorter than the height of the mateable secondary-blocks therefore e.g. movable second-blocks 70, 80, and 90, respectively.

The respective movable secondary blocks 70, 80, and 90, necessarily include planar lower bases so that each of said secondary-blocks will stably uprightly rest upon planar portions of base member upper surface 15 between shield 20 and pedestal 30. Preferably, the cross-sectional shape of each secondary-block is regular along its vertical elongate axis, and accordingly, all horizontal sections of a secondary-block taken parallel to its planar lower base would be substantially identical. At least one of the secondary-blocks is of similar cross-sectional shape to that of at least one of the block-resses whereby said at least one secondary block may be removably insterted within said at least one block-recess as exemplified in FIGURE 2. Moreover, as indicated in the FIGURE 1 perspective view, there is desirably a mateable secondary-block for each block-recess. Thus, the cross-sectional shapes for secondary-blocks 70, 80, and 90, are circular, triangular, and trapezoidal, appropriate to block-recesses 42, 52, and 62, respectively. As illustrated in the FIGURE 2 elevational view, each secondary-block is of slightly smaller cross-sectional shape than is its mateable block-recess, so as to facilitate the insertion of said secondary-block into the appropriate block recess with a pair of manually-operated tongs or similar grasping tool. In this same vane, the height of each secondary-block e.g. 70, should exceed the sidewall height e.g. 44, of its mateable block-recess so that the upper end of each secondary-block may be conveniently grasped with tongs or similar hand tool during the insertion of a secondary-block into its mateable block-recess.

As already alluded to previously, any number of types of manually operable hand tools, including tongs of various types, can be employed to manipulate the various movable blocks, both secondary-blocks and primary-blocks, and insert said movable blocks into the appropriate recesses. An especially challenging type of hand tool is the pair of identical separate arms 100, indicated in phantom line in FIGURE 1. Each of the hand tools 100 comprises in integral linear relationship a forward grasping-member or head 101 having a concave linearly-generated surface, an intermediate elongate stem 102, and a rearward handle 103.

To manipulate the challenging hand tool embodiment 100, the operator positioned rearwardly of base member rearward end 11, grasps two such tools 100, holding the rearward handle 103 in each hand. Then, the operator inserts the pair of hand tools 100 forwardly through shield transverse slot 21, positions a tool head 101 on opposed sides of the movable block to be moved and presses the two identical tools 100 toward each other to grasp the selected movable block between the concave sides of respective tool heads 101. The so-grasped movable block is then carefully and adroitly inserted into the appropriate mating recess. For example, commencing with the initial positions for the six movable blocks as shown in FIGURE 1, the operator-trainee might strive to accomplish the following six blocks movements in order: insert circular secondary-block 70 into circular block-recess 42; insert rectangular primary-block 40 (containing secondary-block 70) into square pedestal-recess 34 (as shown in FIGURE 2); insert triangular secondary-block 80 into triangular block-recess 52; insert circular primary-block 50 (containing secondary-block 80) into circular pedestal-recess 35; insert trapezoidal secondary-block 90 into trapezoidal block-recess 62; and finally insert triangular primary-block 60 (containing secondary-block 90) into triangular pedestal-recess 36. For beginning trainees, the secondary-blocks would not be employed, and the trainee would concentrate upon moving the primary-blocks 40, 50, and 60, into the appropriate pedestal-recesses 34–36. Moreover, relatively uncoordinated trainees, as in the case of very young children or mentally retarded persons, might find it necessary to dispense with, at least during initial trials, the upright shield 20, and in such cases, the removably attachable transverse shield is desirable.

The canopy-shield 200 of FIGURE 3, may be employed alternatively to shield 20. Canopy shield 200 comprises all the elements of shield 20 including the transverse slot 21 and slot lower side 22. However, canopy shield embodiment 200 includes an integral U-shaped transparent canopy portion including two opposed upright sidewalls A and an intervening roof T. Canopy-shield 200 includes a plurality of integral dowel-pins or tenons 29 for removable insertion of canopy-shield 200 into base member 10 e.g. into mortises 18. Thus, as canopy-shield 200 is removably installed onto base member 10, upright sidewalls A thereof lie along base member elongate sides 13 and 14 while intervening roof T overlies that portion of base member upper surface 15 disposed immediately forwardly of upright shield portion 20 at base member rearward end 11. Canopy-shield alternative 200 gives the dexterity training device the amusement and educational advantage of similarities to scientific laboratory apparatuses.

From the foregoing, the construction and operation of the dexterity training device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:
1. A manual dexterity training device comprising:
   (A) a generally horizontal elongate base member having a transverse rearward end, a transverse forward and, and an upper elongate surface;
   (B) a transverse pedestal attachably positioned nearer to the base forward end than to the base rearward end, said pedestal member having an upper surface located above the upper surface of the base member, said pedestal member upper surface having a plurality of downwardly-extending pedestal-recesses therein;
   (C) a plurality of primary-blocks, at least one of said primary-blocks being of similar cross-sectional shape to that of at least one of said pedestal-recesses whereby said at least one primary-block may be removably disposed within said at least one pedestal-recess; and
   (D) an upright transverse shield attachably positioned nearer to the base rearward end than to the base forward end, said upright shield being provided with a transverse slot to permit manually-manipulatable grasping tools to be inserted in the forward direction through said upright shield by an operator.

2. The manual dexterity training device of claim 1 wherein the pedestal-recesses of the transverse pedestal member upper surface comprise at least two distinctly different cross-sectional shapes; and wherein at least two of the primary-blocks are of similar cross-sectional shape to the two differing pedestal recesses.

3. The manual dexterity device of claim 1 wherein the base member has a substantially horizontal planar upper surface; wherein the lower transverse side of the upright shield transversely slotted portion is substantially horizontal; wherein the upper surface of the transverse pedestal member is substantially horizontal and of substantially equal elevation as the lower transverse side of the upright shield transversely slotted portion; wherein the upright transverse shield is removably attached to the base member; wherein the transverse pedestal member comprises a rearward upright transverse surface that is substantially parallel to the upright shield; wherein the pedestal-recesses of the pedestal member upper surface are of at least two different cross-sectional shapes; and wherein at least two of the primary-blocks are of similar cross-sectional shape to the two differing pedestal-recesses.

4. The manual dexterity device of claim 2 wherein said primary-blocks have an upper surface, said primary-block upper surface having a downwardly-extending block-recess therein; and wherein there is a plurality of secondary-blocks, at least one of said secondary-blocks being of similar cross-sectional shape to that of at least one of said block-recesses whereby said at least one secondary-block may be removably disposed within said at least one block-recess.

5. The manual dexterity device of claim 3 wherein said primary-blocks have an upper surface, said primary-block upper surface having a downwardly-extending block-recess therein; and wherein there is a plurality of secondary-blocks, at least one of said secondary-blocks being of similar cross-sectional shape to that of at least one of said block-recesses whereby said at least one secondary-block may be removably disposed within said at least one block-recess.

6. The manual dexterity training device of claim 4 wherein the said plurality of pedestal-recesses comprises a plurality of distinct geometrical cross-sectional shapes; wherein the primary-blocks are of sufficient number and geometric shape to fill all of said pedestal recesses, a plurality of said primary-blocks having substantially horizontal planar upper and lower surfaces; wherein the lower surface of a plurality of said secondary-blocks are substantially planar whereby said secondary-blocks may rest upon the base member upper surface; and wherein there is a transversely disposed transparent canopy extending longitudinally between the upright shield and the pedestal member.

7. The manual dexterity training device of claim 5 wherein the said plurality of pedestal-recesses comprises a plurality of distinct geometrical cross-sectional shapes; wherein the primary-blocks are of sufficient number and geometric shape to fill all of said pedestal recesses, a plurality of said primary-blocks having substantially horizontal planar upper and lower surfaces; wherein the lower surface of a plurality of said secondary-blocks are substantially planar whereby said secondary-blocks may rest upon the base member upper surface; and wherein there is a transversely disposed transparent canopy extending longitudinally between the upright shield and the pedestal member.

8. A manual dexterity training device comprising:
   (A) a generally horizontal base member having a transverse rearward end, a transverse forward end, and an upper surface;
   (B) a transverse pedestal attachably positioned nearer to the base forward end than to the base rearward end, said pedestal member having an upper surface located above the upper surface of the base member, said pedestal member upper surface having a plurality of downwardly-extending pedestal-recesses therein;
   (C) a plurality of primary-blocks each having an upper surface, at least one of said primary-blocks being of similar cross-sectional shape to that of at least one of said pedestal-recesses whereby said at least one primary-block may be removably disposed within said at least one pedestal-recess, said primary-block upper surface having a downwardly-extending block-recess therein; and
   (D) a plurality of secondary-blocks, at least one of said secondary-blocks being of similar cross-sectional shape to that of at least one of said block-recesses whereby said at least one secondary-block may be removably disposed within said at least one block-recess.

9. The manual dexterity training device of claim 8 wherein there is a plurality of pedestal-recesses comprising a plurality of distinctly different geometrical cross-sectional shapes; wherein the primary-blocks are of sufficient number and geometric shape to fill all of said pedestal recesses, a plurality of said primary-blocks having substantially horizontal planar upper and lower surfaces; and wherein the lower surface of a plurality of said secondary-blocks are substantially planar.

10. The manual dexterity training device of claim 9 wherein an upright transverse shield is attachably positioned nearer to the base rearward end than to the base forward end, said upright shield being provided with a transverse slot to permit manually-manipulatable grasping tools to be inserted in the forward direction through said upright shield by the operator; and wherein there is a transversely disposed transparent canopy extending longitudinally between the upright shield and the pedestal member.

References Cited

UNITED STATES PATENTS

| | | | |
|---|---|---|---|
| 741,903 | 10/1903 | Gates | 35—8 |
| 2,659,163 | 11/1953 | Albee | 35—8 |
| 2,985,451 | 5/1961 | Sims | 35—22 X |

EUGENE R. CAPOZIO, Primary Examiner

WILLIAM H. GRIEB, Assistant Examiner

U.S. Cl. X.R.

35—22; 273—1